4 Sheets—Sheet 1.

A. WHITTEMORE.
MACHINE FOR MAKING SPLIT SPIKES.

No. 170,322. Patented Nov. 23, 1875.

WITNESSES

INVENTOR
Amos Whittemore,
Chipman Hosmer &C.
ATTORNEYS

4 Sheets—Sheet 2.

A. WHITTEMORE.
MACHINE FOR MAKING SPLIT SPIKES.

No. 170,322. Patented Nov. 23, 1875.

WITNESSES
E. H. Bates
D. G. Miller

INVENTOR
Amos Whittemore
Chipman Hosmer & Co.
ATTORNEYS

A. WHITTEMORE.
MACHINE FOR MAKING SPLIT SPIKES.
No. 170,322. Patented Nov. 23, 1875.
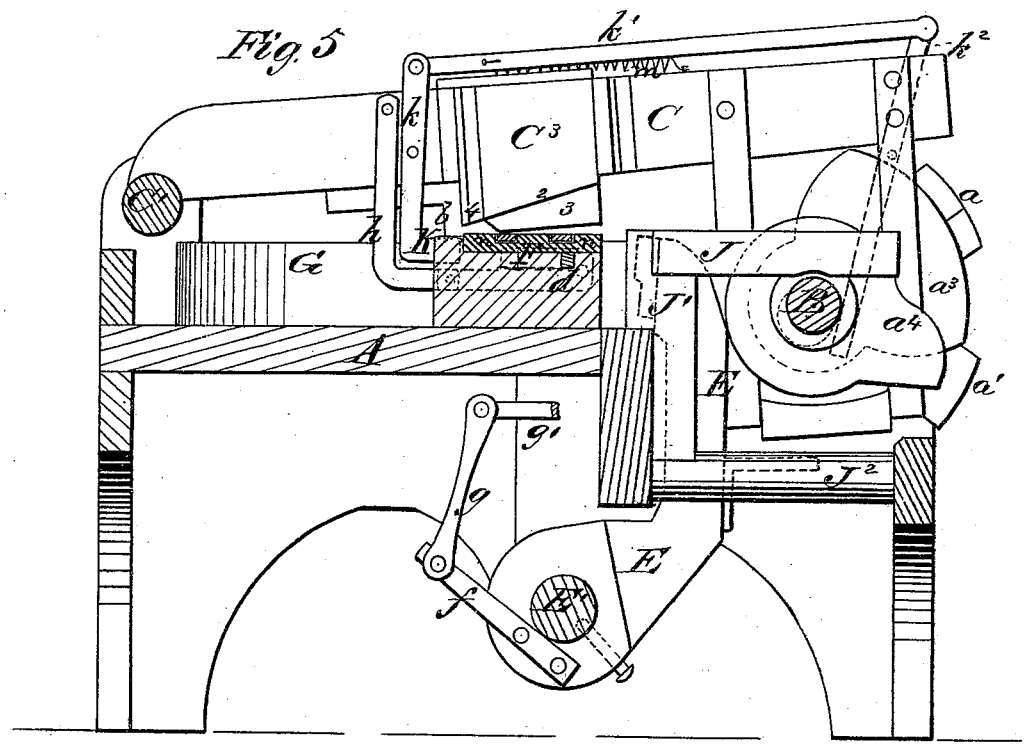
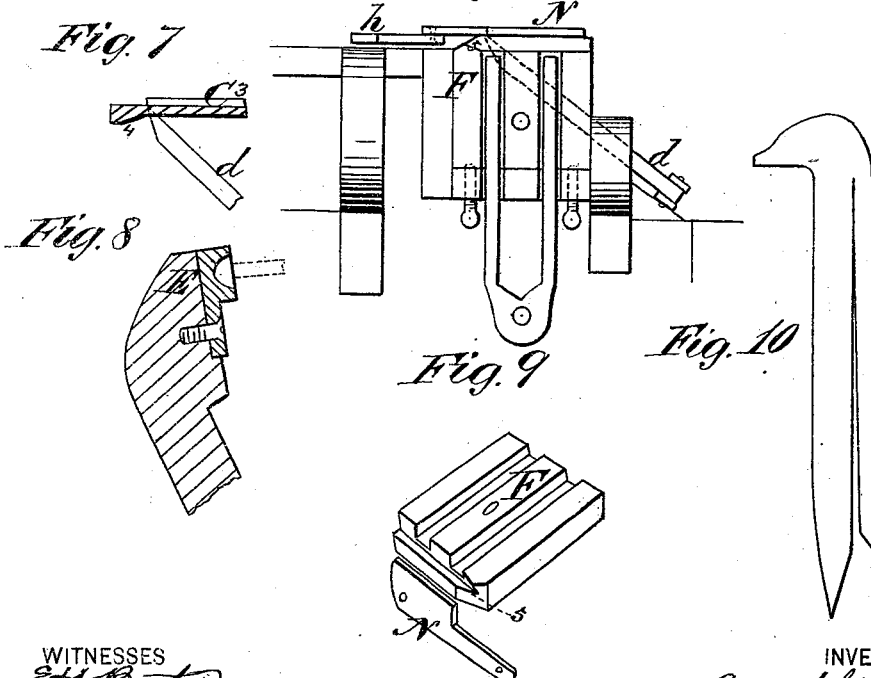

4 Sheets—Sheet 4.

A. WHITTEMORE.
MACHINE FOR MAKING SPLIT SPIKES.

No. 170,322. Patented Nov. 23, 1875.

WITNESSES

INVENTOR
Amos Whittemore,

Chipman Fosmer & Co.
ATTORNEYS

UNITED STATES PATENT OFFICE.

AMOS WHITTEMORE, OF CAMBRIDGEPORT, MASSACHUSETTS.

IMPROVEMENT IN MACHINES FOR MAKING SPLIT SPIKES.

Specification forming part of Letters Patent No. 170,322, dated November 23, 1875; application filed December 26, 1874.

*To all whom it may concern:*

Be it known that I, AMOS WHITTEMORE, of Cambridgeport, in the county of Middlesex and State of Massachusetts, have invented a new and valuable Improvement in Split-Spike Machine; and I do hereby declare that the following is a full, clear, and exact description of the construction and operation of the same, reference being had to the annexed drawings making a part of this specification, and to the letters and figures of reference marked thereon.

Figure 1:
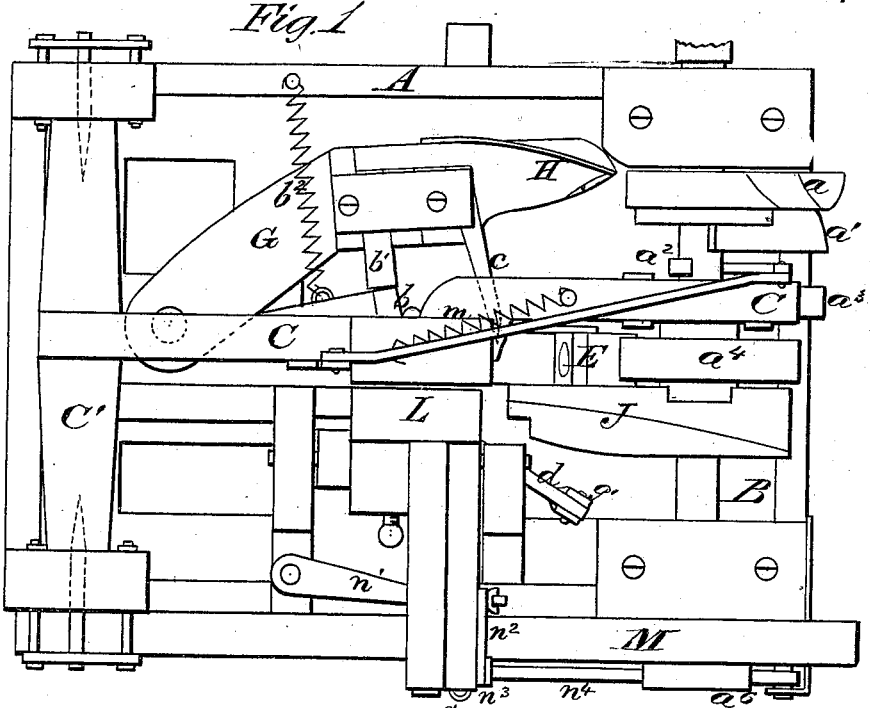
Figure 2:
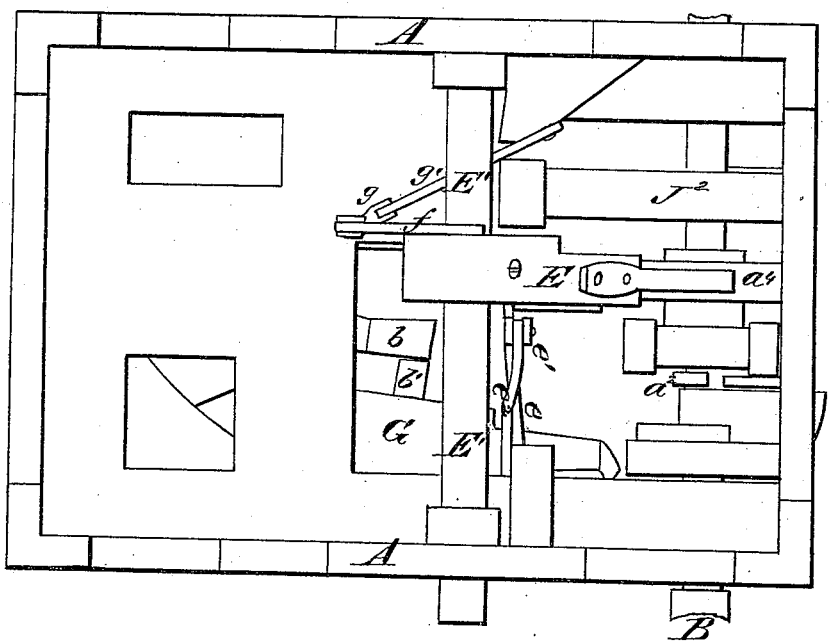
Figure 3:
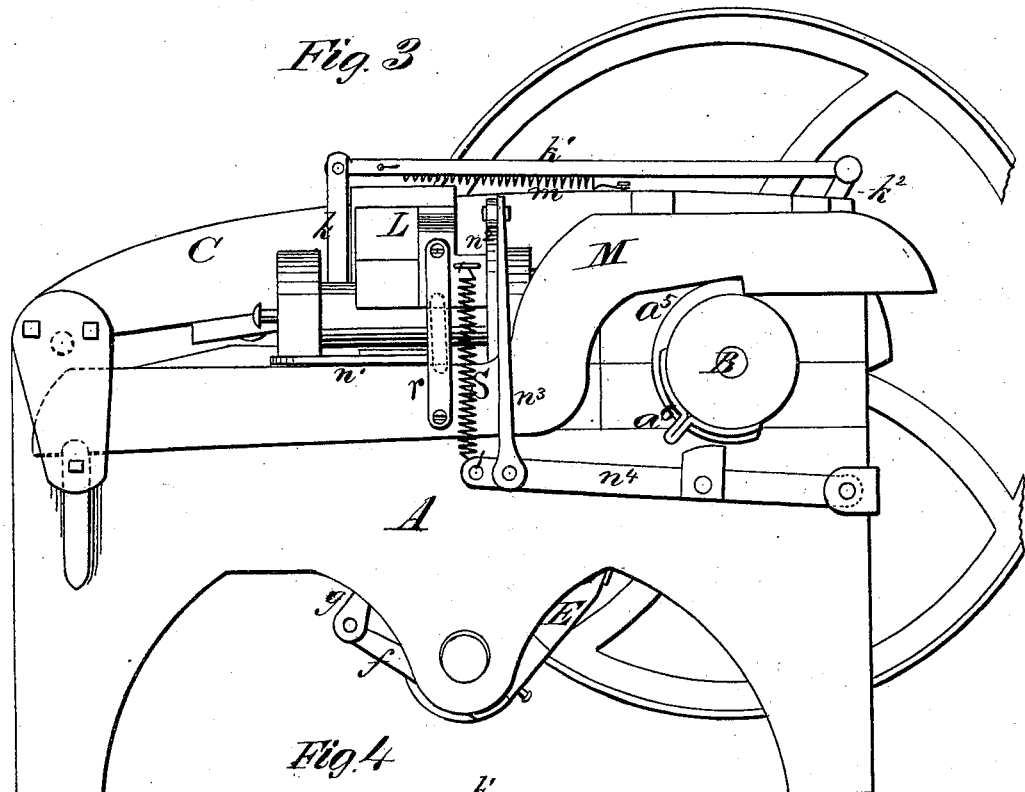
Figure 4:
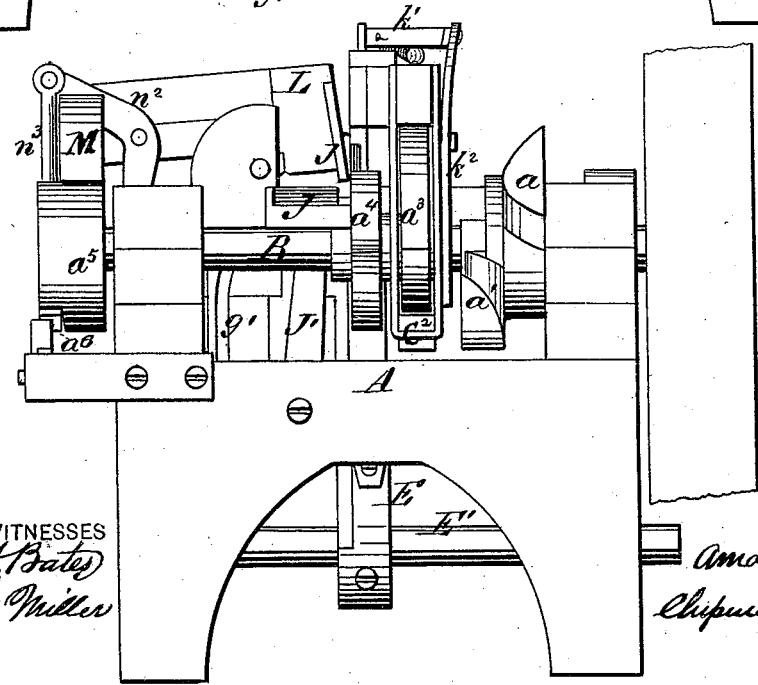
Figure 11:
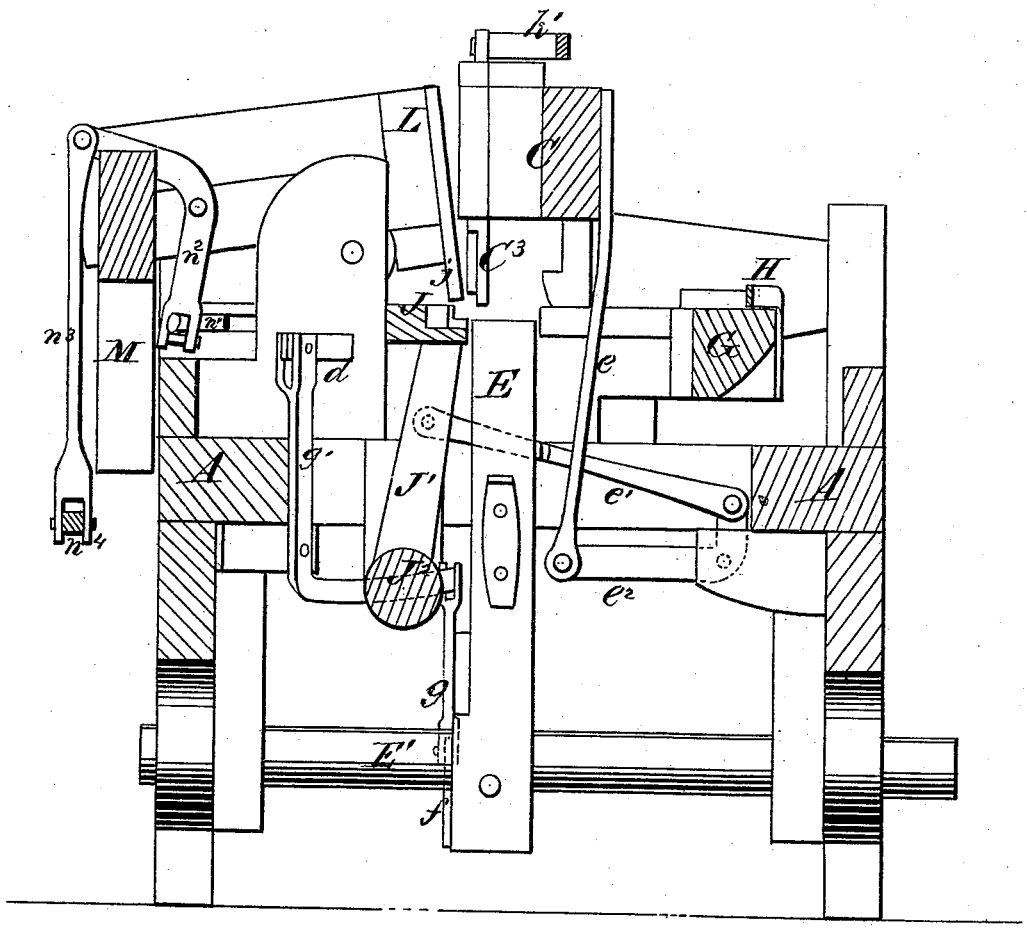

Figures 1 and 2 of the drawings are representations of plan views of my machine, and Fig. 3 is a side view of the same. Fig. 4 is an end view, and Fig. 5 a sectional view, of the same. Figs. 6, 7, 8, 9, and 10 are detail views, and Fig. 11 is a vertical transverse sectional view, of the same.

This invention has relation to machinery which is designed for making split spikes for holding down railroad-rails, and for other purposes; and the machinery which I shall hereinafter describe is especially designed for making the spike which is described in the schedule annexed to the Letters Patent granted to George W. McGill, June 4, A. D. 1867.

The nature of my invention consists in certain improvements in machines for manufacturing split spikes, as will be hereinafter more fully set forth.

The following is a description of my improvements:

In the annexed drawings, A designates a rectangular frame, which is adapted to contain and give support to the mechanism for making the spikes. B is the main driving-shaft, which extends across the front part of the frame A, and should be provided with a balance-wheel. On this shaft B are applied seven cams, lettered, respectively, $a$ $a^1$ $a^2$ $a^3$ $a^4$ $a^5$ $a^6$. C designates a long lever, which extends from the front to the rear of the frame A, and is secured to a rock-shaft, $C^1$. This lever receives vertical vibration from the cam $a^3$, which acts first directly on the lever to lift it, and then upon a yoke, $C^2$, to depress it. The front part of lever C is in a plane a little to one side of the rear portion of this lever, for the purpose of affording space for the cam $a^4$, which moves a heading-tool, E, forward and backward. The heading-tool is secured to a shaft, E', which is allowed to receive endwise movement, as well as a rocking movement.

The lever C has adjustably secured to it the upper shearing or splitting device $C^3$, shown in Figs. 5 and 7, which device has an inclined cutting-edge, 2, a supporting-flange, 3, and an angular cutting-edge, 4. The edge 2 splits the spike-blank while it is lying on the stationary die F, the flange 3 supports the prong against lateral displacement while forming the same, and the angular edge 4 cuts off a piece from the end of the spike-rod, and finishes the point on the shank of the spike.

These operations are all performed during the descending stroke of the lever C. The vertical side of the die F terminates at the rear end of this die, in an angle, 5, into which the end of the spike is bent to form one side of the point on the shank of the spike. This bending is done by means of a vibrating bending-tool, $b$, which is pivoted to the lower edge of the lever C, and held in contact with a plunger, $b^1$, on a lever, G, by means of a spring, $b^2$.

It will be seen that the point on the shank of the spike is formed by processes of bending and cutting. Lever G is pivoted near the rear end of the frame A, and curves forward, terminating in a beveled end, which is in range of the two cams $a$ $a^1$, on the main shaft B. The cam $a$, during its revolution, moves the lever G to the left, and brings the bending-tool $b$ into play, and also causes a tool, $c$, on lever G to cut a spike-blank from the spike-rod. The cam $a^1$ gives the back strokes to the lever G. H designates a spring, which is secured to the free end of the lever G in such a position that it will be struck by the cam $a$ at the commencement of each forward stroke of said lever. Spring H will modify the shocks on lever G when struck by the cam $a$. J designates the feed-table, which is arranged in front of the die F and secured to an arm, $J^1$, rising from a rock-shaft, $J^2$. This table J is arranged on the left-hand side of the heading-tool and in close relation to it, and both the table and the tool last-named receive lateral movements from the lever C by means of connecting-rods $e$ $e^1$ and an angular lever, $e^2$. When lever C rises it brings the table J in in a position for guiding a spike-rod upon the die F, and when lever C descends it moves the table J out of the way, and, at the same time, moves the heading-tool E in position for making a head on the spike in the die F.

Immediately after the prong of the spike is thrown down by the cutter 2 a chisel-edge is formed on this prong by means of a cutting-tool, $d$, shown in Figs. 6 and 7, which tool plays obliquely through the bed of the die F, and cuts past the rear edge of the flange 3 of the movable die or splitting device. The cutting-tool $d$ receives its movements from an arm, $f$, on the lower end of the header-arm, through the medium of a link, $g$, and an angular lever, $g'$. The formation of said chisel-edge on the prong of the spike takes place while the header is performing its work. N designates a prong-replacer, which is pivoted at one end to the bed of die F, and connected by a link, $h$, to the lever C. This replacer descends with lever C in advance of the prong of the spike, and when the spike is completely split and the lever C rises it carries with it the replacer, and leaves the spike ready for use. L designates a spike-holder, which is a vibrating lever, made very strong, and constructed with a narrow griping portion, $j$, which latter is arranged over part of the die F, and is moved down upon the spike-rod immediately after its end is bent by the tool $b$, so that, during the subsequent operations of pointing, splitting, and heading, the spike-blank is firmly held down upon the die F. K designates a feed-gage, against which the end of the spike-rod abuts, when it is adjusted in proper position in the machine. This gage K is formed on the lower end of a lever, $k$, which lever is pivoted to the lever C, and connected by a rod, $k^1$, to a lever, $k^2$. The gage K is moved forward to receive the spike-rod by means of a cam, $a^2$, on the main shaft B, and said gage is moved back by means of a spring, $m$. The die-bed is grooved transversely, and in the grooves of this bed play two prongs, $n$ $n$, which are arranged a suitable distance apart, and are pivoted to a vibrating arm, $n^1$. The object of these prongs is to discharge the spikes immediately after the holder L releases them. The dischargers receive their forward movements from the cam $a^6$ through the medium of arm $n^1$, angular lever $n^2$, connecting-rod $n^3$, and a lever, $n^4$, and the backward movements are given to the dischargers by means of a spring, S.

The spike-holder L is brought down upon the spike-blank in the die F by means of the cam $a^5$, acting on a lever, M, to which the outer end of said holder is connected by a rod, $r$.

The operation of my machine is briefly as follows: The lever C and holder L being in elevated positions, the lever G being in the position shown in Fig. 1, and the table J being in line with the die F, a spike-rod, properly heated, is pushed over the table J and die F until its end abuts against the feed-gage K. The tool C then advances and severs a blank from the rod; at the same time the bender $b$ bends the end of the rod into the angle in the die F, and forms one side of the point of the shank. The holder L then descends and firmly clamps the blank in the die F, and while the blank is so held the lever C descends, and the blank is split to form the prong, the point of the shank is finished, the end of the prong is beveled, and the head is formed on the blank. While lever C is rising it carries with it the replacer N, which brings the prong back to its place, thus finishing the spike. The gage recedes before the discharging mechanism is brought into play, for the purpose of preventing the point of the shank of the spike from being bent by the gage or abutment during the act of discharging the spike by the prongs $n$ $n$.

What I claim as my invention, and desire to secure by Letters Patent, is—

1. The receding feed-gage K, against which the end of the spike abuts, in combination with the levers $k$ C, rod $k^1$, lever $k^2$, and cam $a^2$, substantially as and for the purposes set forth.

2. The shearer $C^3$, having an inclined cutter, 2, a supporting-flange, 3, and an angular cutting-edge, 4, in combination with the die F, substantially as and for the purpose set forth.

3. The combination, substantially as described, of the die F, the table J, provided with mechanism for laterally moving it, and the header E, provided with mechanism for moving it longitudinally and laterally, as set forth.

4. The cutter $d$, operating in a diagonal direction by appropriate mechanism, in combination with the die F and shearer $C^3$, substantially as described.

5. In a spike-splitting machine, a horizontal laterally-movable lever, G, carrying the plunger $b'$, which moves forward the bending-tool $b$, and also the tool which cuts the spike-blanks from the spike-rods, in combination with the cams $a$ $a^1$, substantially as described.

6. The spring-arm H, applied on the free end of the lever G, in the manner and for the purpose described.

7. The spike-holder E, having its fulcrum in lugs attached to the main frame, in combination with the cam $a^5$, lever M, and rod $r$, substantially as and for the purpose set forth.

8. The reciprocating prongs $n$ $n$, arranged at a suitable distance apart, and pivoted to the arm $n^1$, in combination with the cam $a^6$, angular lever $n^2$, connecting-rod $n^3$, lever $n^4$, and grooved die-bed F, substantially as set forth.

9. The replacer N, pivoted at one end to the die-bed F, and having its opposite end connected to link $h$, in combination with the vertically-vibrating lever C, substantially as described.

10. The die F, having the angle 5, in combination with the bending-tool $b$, pivoted to the lever C, lever G, and cams $a$ $a^1$, substantially as described.

11. The combination, substantially as described, of a bender for forming one side of the point of the spike-blank, a cutter for forming the other side of the same, a shear for splitting the blank to form a prong thereon, a diagonally-operating cutter for beveling the point of said prong, and a replacer for replacing said prong, as and for the purpose set forth.

In testimony that I claim the above I have hereunto subscribed my name in the presence of two witnesses.

AMOS WHITTEMORE.

Witnesses:
   GEO. E. UPHAM,
   JOHN B. CORLISS.